(12) United States Patent
Fahy

(10) Patent No.: US 7,739,692 B2
(45) Date of Patent: Jun. 15, 2010

(54) MINIMIZING THE DEPENDENCY OF SOURCE CODE ON THE IN-BAND RESOURCES OF A SET-TOP BOX

(75) Inventor: James B. Fahy, Del Mar, CA (US)

(73) Assignee: Research Investment Network, Inc., Long Beach, CA (US)

( * ) Notice: Subject to any disclaimer, the term of this patent is extended or adjusted under 35 U.S.C. 154(b) by 1682 days.

(21) Appl. No.: 10/914,826

(22) Filed: Aug. 10, 2004

(65) Prior Publication Data
US 2005/0149478 A1    Jul. 7, 2005

Related U.S. Application Data

(60) Provisional application No. 60/534,317, filed on Jan. 5, 2004.

(51) Int. Cl.
*G06F 3/00* (2006.01)
*G06F 9/44* (2006.01)
*G06F 9/46* (2006.01)
*G06F 13/00* (2006.01)

(52) U.S. Cl. .......................... 719/327; 725/151; 713/1
(58) Field of Classification Search .................. 700/250; 725/151–153; 719/310–327; 710/8–10; 713/1, 2
See application file for complete search history.

(56) References Cited

U.S. PATENT DOCUMENTS

| 6,889,118 B2* | 5/2005 | Murray et al. | 700/250 |
| 2002/0170039 A1* | 11/2002 | Kovacevic | 717/138 |
| 2003/0056090 A1* | 3/2003 | Khanna et al. | 713/1 |
| 2003/0131043 A1* | 7/2003 | Berg et al. | 709/104 |
| 2004/0049672 A1* | 3/2004 | Nollet et al. | 713/100 |
| 2005/0144332 A1* | 6/2005 | Nellitheertha | 710/15 |

* cited by examiner

*Primary Examiner*—Diem K Cao
(74) *Attorney, Agent, or Firm*—Westman, Champlin & Kelly, P.A.; David D. Brush

(57) ABSTRACT

The present invention is directed to minimizing the dependency of source code on the characteristics of a set-top box's in-band (streaming video or audio) hardware. The set-top box software consists of a device driver layer, which is intimately aware of hardware characteristics, an application layer, which is relatively unaware of any hardware details, a middleware layer which is also relatively unaware of any hardware details, and a device translation layer (DTL). In the DTL, all of the translation between device abstractions to device driver calls that were formerly made in middleware are moved down to an engine manager. Middleware thus becomes device-independent with respect to in-band devices, and porting Middleware to new hardware becomes trivial.

41 Claims, 10 Drawing Sheets

MINIMIZING THE DEPENDENCY OF SOURCE CODE ON THE IN-BAND RESOURCES OF A SET-TOP BOX

CROSS-REFERENCE TO RELATED APPLICATIONS

This application is a non-provisional, utility patent application, which claims priority from provisional U.S. Application No. 60/534,317, filed Jan. 5, 2004, entitled Engine Manager.

FIELD OF THE INVENTION

The present invention generally relates to devices capable of recording and playing back broadcast signals and more specifically to minimizing the dependency of source code on the in-band resources of a set-top box.

BACKGROUND OF THE INVENTION

A set-top box is a device that enables a television set to become a user interface capable of receiving and decoding broadcast signals via phone, cable, satellite, the Internet, or other means of communication. Newer Set-top boxes typically include a Personal Video Recorder (PVR) capability, which additionally can record and playback broadcast signals. PVR lets the viewer watch shows in a time shifted mode so that the viewer can apply VCR-like functionality to live broadcasts. For example, the PVR lets the viewer pause, replay, rewind, fast-forward, or skip over advertising while viewing a live show.

The enhanced set-top box has become increasingly complex. The increase in functionality leads to an increase in the hardware components and interconnections used to implement that functionality. Earlier set-top boxes were designed to support a single tuner with audio, video, and data outputs.

Connections between the various components were more or less fixed in stone. While a simple system with fixed connections works well for simple hardware, it begins to become unwieldy and inadequate when more complicated hardware allows the dynamic configuration of multiple input devices (e.g., tuners, buses, and memory devices) feeding multiple output devices (decoders, memory devices, and buses) simultaneously. If a developer tries to hand-code all possible legal configurations of the hardware devices, the developer will quickly discover that the number of cases becomes very large. Hand-coding all possible configurations is possible but it represents a maintenance nightmare.

Furthermore, hand-coding must be repeated for each new product developed. Thus, it is desired to find a way to more general approach that is flexible and allows for reduced maintenance and re-use of software.

SUMMARY OF THE INVENTION

The present invention is directed to minimizing the dependency of source code on the characteristics of a set-top box's in-band (streaming video or audio) hardware. Traditionally, set-top box's software has consisted of three layers: a device driver layer, which is intimately aware of hardware characteristics, an application layer, which is relatively unaware of hardware details, and a middleware layer, which lies between the other two. Middleware provides abstraction of hardware, and presents a toolbox of Application Program Interface (API) to the application layer. A controlling program can use the tools in this tool box to compose a Graphical User Interface, enable tuning and downloading of guide data, download and start other applications, and generally expose functionality to the end user.

The present invention introduces an additional software layer, beneath the middleware and above the device driver layer, called the Device Translation Layer (DTL). In the DTL, all of the translation between device abstractions to device driver calls that were formerly made in Middleware are moved down to a new entity called an Engine Manager. Middleware thus becomes device-independent with respect to in-band devices, and porting Middleware to new hardware becomes trivial. The Engine Manager, which now contains all of the in-band device dependence, is explicitly designed to make the translation from abstract models to actual device drivers as simple as possible. In other words, device translation has been "optimized" within Engine Manager.

In one embodiment of the present invention a set top box environment is coded with a high-level application layer, a middleware layer that is hardware independent, the Device Translation Layer, and a low-level, hardware-dependant device driver layer. The Device Translation layer includes the Engine Manager, which optimizes translation using an internal two-layer abstraction model as follows:

1. The device-driver interfaces to specific hardware components are modeled as "parts" that, when connected together, and "started," cause data to flow from one part to the next.

2. Certain useful collections of multiple connected parts are referred to as "engines." Engines correspond to the higher-level task abstractions that are known to middleware. Thus, there is a type of engine that tunes to a frequency and decodes video. There is another type of engine that tunes to a frequency and stores the data to disk, and so on.

When the user interacts with the application layer to accomplish some high-level task, such as change the channel or record a show, Middleware requests an engine of a specific type from Engine Manager. Engine manager translates the type of the engine into an Engine Plan, which is just a specification of what kinds of parts should be connected together to form an engine. Then a Scheduling Algorithm is initiated, which a. searches for available parts needed by the plan;
   b. connects the parts together,
   c. initializes the state of all the parts in the engine, and
   d. starts each part in an appropriate order, thus
   e. initiating data flow within the engine and accomplishing the desired task.

In one embodiment all in-band resources are modeled as parts that can be added to or removed from a set top dynamically. Part description files written in a part definition language (PDL) contain part definitions, which define the fundamental characteristics of the part, and definitions of what the part can connect to. Files written in an engine definition language (EDL) contains engine plans and describe what parts must be connected together in order to provide a given high-level function.

A parser or compiler reads the PDL scripts and creates a virtual shop of parts. A separate parser reads the EDL scripts to build a virtual file cabinet of engine plans. One embodiment of the present invention allows new plans to be added or removed from a set-top dynamically.

An engine plan is also referred to as an Engine Class. Compilation of an engine class refers to calculating all possible ways in which an engine class can be instantiated with any combination of parts from the shop. One embodiment of the present invention involves pre-compilation of engine plans during system boot up, so a list of possible instantiations is already known when the user requests a specific function corresponding to that engine class. This allows the time required to perform scheduling to be imperceptible to the user.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

The present invention is directed to minimizing the dependency of source code on the characteristics of set-top box's in-band (streaming video or audio) hardware. Traditionally, set-top box's software has consisted of three layers: a device driver layer, which is intimately aware of hardware characteristics, an application layer, which is relatively unaware of hardware details, and a middleware layer, which lies between the other two. Middleware provides abstraction of hardware, and presents a toolbox of APIs to the application layer. A controlling program can use the tools in this toolbox to compose a Graphical User Interface, enable tuning and downloading of guide data, download and start other applications, and generally expose functionality to the end user.

The present invention introduces another software layer, beneath the middleware and above the device driver layer, called the Device Translation Layer (DTL). In the DTL, all of the translation between device abstractions to device driver calls that were formerly made in Middleware are moved down to a new entity called an Engine Manager. Middleware thus becomes device-independent with respect to in-band devices, and porting Middleware to new hardware becomes trivial.

Figure 1:
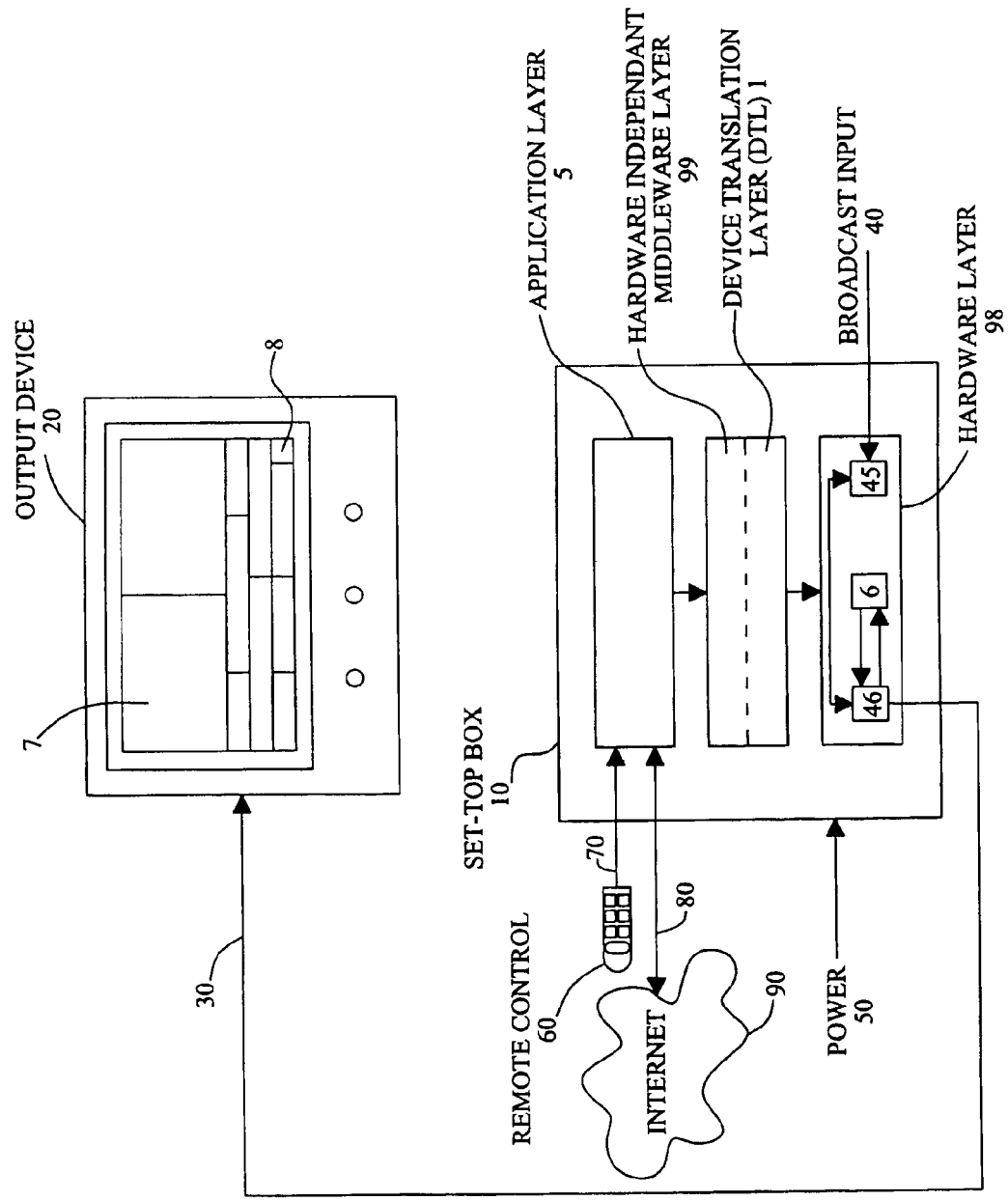
FIG. 1 is an embodiment of a set top box environment according to the invention.

Referring more specifically to the drawings, for illustrative purposes an embodiment of a set-top box environment is shown in the functional block diagram of FIG. 1. A set-top box environment includes software running in a high level, application layer 5 that helps the user control the set-top box in an enjoyable manner. The environment includes some or all of a combination of software, hardware, and firmware.

In one embodiment, a hardware layer 98 uses a disk drive storage device 6 that is internal to a set-top box 10 where broadcasts are transferred to the storage device 6. The set-top box 10 connects to an output device 20, which facilitates the use of broadcast signals, such as live television signals, video on demand broadcasts, downloads of Internet content, viewing of web pages, and viewing of content transferred to the storage device. In the example of FIG. 1, set-top box 10 is shown as being external to output device 20. It should be understood by someone having ordinary skill in the art, that set-top box 10 may be internal to output device 20 as well.

A graphical user interface (GUI) 7, which includes an IPG 8 is provided and is selectively displayed on the output device 20, for instance when a user presses a specific button on a remote control 60. GUI 7 in conjunction with IPG 8 allows the user to control the device via UI layer 5. The software or firmware that controls set-top box 10 may be installed locally or it may be downloaded from the Internet 90 as needed when configuring new set-top boxes or when updating existing ones.

Set-top box 10 is connected to output device 20 via a transmission line 30. Broadcast signals are received by the set-top box 10 via transmission line 40, which may be connected to either an antenna, a cable television outlet, or a satellite connection. One or more tuner systems 45 are configured to allow the system to receive broadcast signals from multiple channels simultaneously up to the given number of tuners. As the broadcast input signal enters the system along line 40, it is tuned by one of the tuners 45 and transferred to volatile memory 46, which might include RAM, ROM, cache memory, or other volatile memory source. Volatile memory 46 might include a buffering mechanism, such as a circular or linked list buffer that allows a user to view a delayed live broadcast. The broadcast content is transferred to storage device 6 if it is saved permanently.

Set-top box 10 receives power through a line 50. Set-top box 10 receives user input entered from handheld remote control 60 over a wireless link 70. Wireless link 70 may be an infrared (IR) link, a radio frequency (RF) link, or any other suitable type of link. A bi-directional data path 80 is provided to set-top box 10, through which set-top box 10 can access the Internet 90. Transmission line 40 may provide data from a variety of input sources including cable, satellite, or electromagnetic waves.

All of the hardware shown with respect to FIG. 1 uses low-level hardware dependant driver code in layer 98, which is controlled via the user's interaction with application layer 5. This causes a problem when hardware and its corresponding low-level driver code are changed. In order to overcome this problem, a new architecture according to the present invention is implemented. Wherein a hardware independent middleware layer 99 and a device translation layer (DTL) 1 are added between the application layer 5 (i.e., the high level user interface code) and the actual hardware layer 98 (including the low level, hardware dependent driver code).

Figure 2:
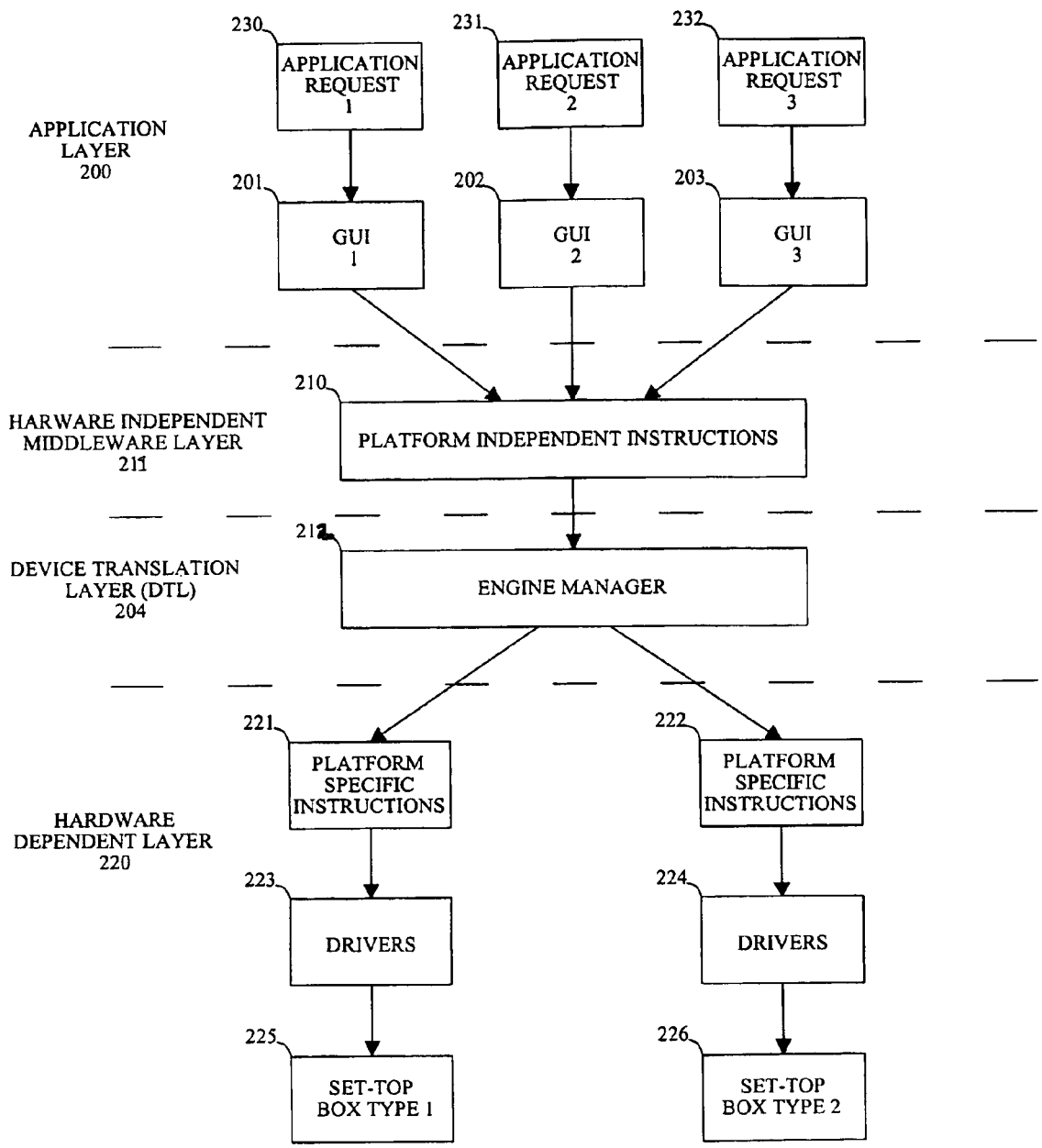
FIG. 2 shows some of the major components of a set top box according to one embodiment of the present invention.

FIG. 2 shows set top box 10 of FIG. 1 in more detail. Application layer 200 includes GUIs 1, 2, and 3 labeled 201-203 respectively. GUIs include, for instance, the power tv platform, the open cable application platform, the Motorola platform, etc. GUIs 201-203 are used by way of example. The present invention is configured to work in any arbitrary GUI. When a user interacts with GUIs 201, 202, or 203, (for instance by watching tv or recording a show) they do so by making application requests in blocks 230, 231 and 232.

A request is made to hardware independent middleware layer 210 from the application layer 200, where platform independent instructions 211 are used by the engine manager 212 in a DTL layer 204 to compile or parse the instructions into an engine plan or software model that corresponds to actual hardware that is available to the system. The engine plan is implemented with platform specific instructions 221 and 222 that communicate with drivers 223 and 224 to control set-top box hardware 225 and 226.

FIG. 2 illustrates the concept that two different machines 225 and 226 can be controlled using the same platform independent instructions 211, thereby releasing the developer creating the platform independent instructions 211 from knowing the inner workings of machines 225 and 226 or its drivers 223 and 224. Moreover, since translation between device abstractions to device driver calls that were formerly made in Middleware layer 210 are moved down to DTL layer 204, middleware layer 210 also becomes device-independent with respect to in-band devices, for instance in set top boxes 225 and 226. Thus, porting middleware layer 210 to new hardware becomes trivial.

Figure 3:
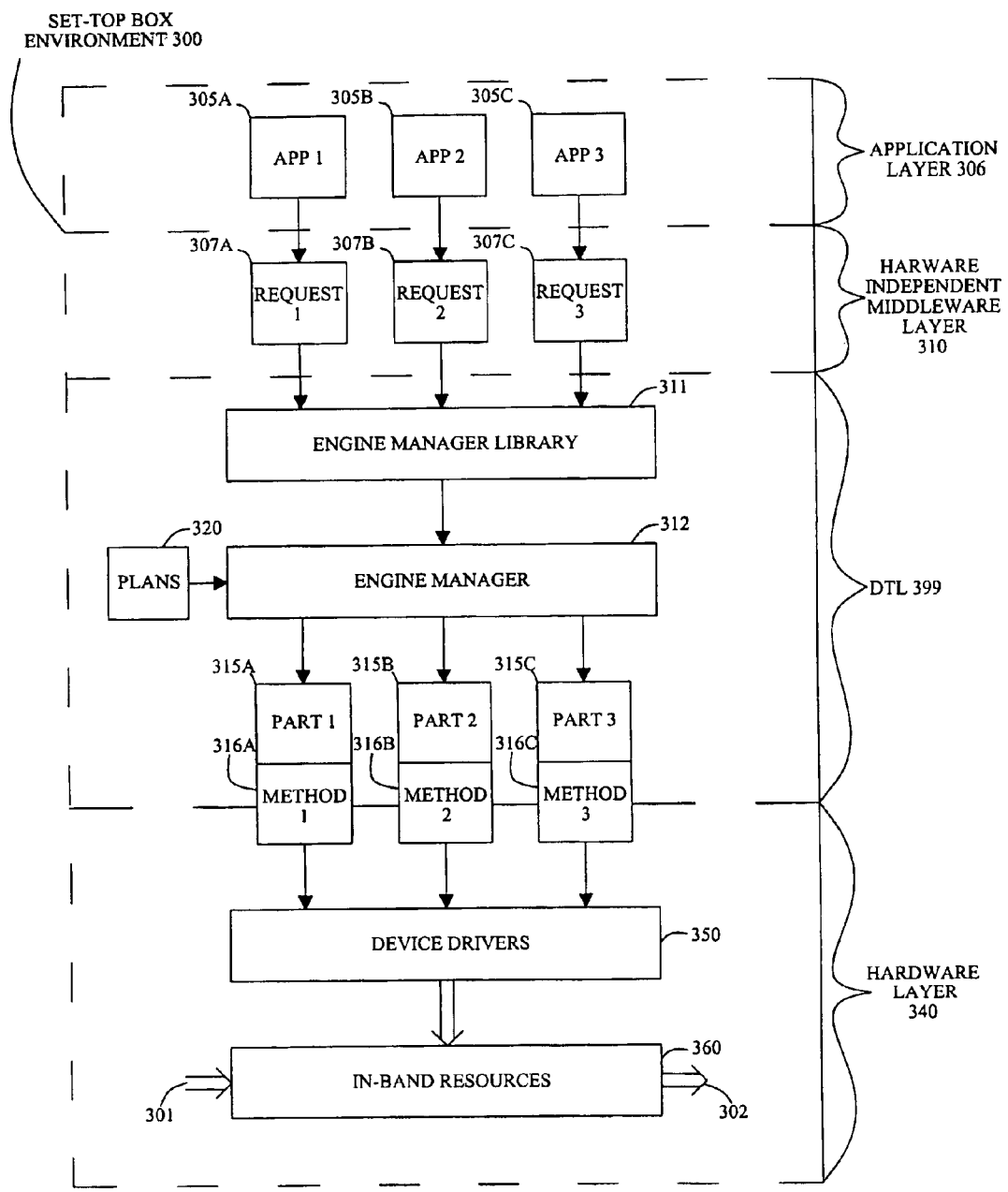
FIG. 3 is a block diagram of a code hierarchy according to an embodiment of the present invention.

FIG. 3 shows the improved code hierarchy that results when the source code and the in-band resources in a set-top box environment have their dependencies minimized. According to one embodiment of the present invention, the set top box environment 300 comprises one or more applications 305a, 305b, 305c that are used to represent software requests from an application layer 306, these applications include requests, for instance, that are generated from applications running in the power tv or OCAP environment, such as Passport PVR or Voyager developed by Pioneer Digital Technologies, Inc.

These applications make requests 307a-c to the platform independent middleware layer 310 when the user performs an action that requires a response, for instance by tuning the television to a particular channel or opening a picture in picture window. In this example, application 305a makes a request 307a that requires a tuner to television chain of hardware. Application 305b requires a tuner to disk chain, and application 305c requires a disk to tv chain. Applications 305a-c are show the source and destination hardware required, but it will be noted by one skilled in the art that one or more other pieces of hardware may be required between the source and destination to fulfill the application's request.

The requests 307a-c provide input to engine manager library 311 in the DTL 399, which uses a part definition file that specifies what classes of parts are available and what connective properties the parts have, including whether many parts are needed in a series to complete the source, destination request. The Engine Manager 10 uses the part definition files from library 311 and uses a compiler or parser 313 to generate engine plans 320 in an EDL. A scheduler 314 is used by engine manager 312 once plans 320 are generated. The scheduler reserves the actual instances of parts 315a, 315b, and 315c that will be needed in software model layer 330 between layer 310 and hardware dependent layer 340.

Parts 315a-315c use associated methods 316a-316c to interact with device drivers 350 in layer 340, which in turn is used to control the actual hardware 360 that is needed. The device drivers 350 are low-level software programs, which control the in-band hardware resources of module 360. The input 301 to the hardware (in band resources) 360 comprises, for example, information signals containing video, audio, voice channels, data, or other information. The output 302 provides video, audio, and data channels to a video display monitor, for instance.

In-band resources are those that allow a set-top box to accept analog or digital data and route it either to audio/visual output, disk or a bus, such as an IEEE 1394 bus. In-band resources include everything necessary for receiving, routing, decrypting, and decoding the in-band data. Some example of in-band resources include a tuner, demodulator, a transport stream switch (TSS), PID (packet identifier) filters, PSI (program specific information) filters, audio & video decoders, record and playback channels, disk bandwidth allocation, IEEE1394 streaming, a main window, a PIP window, capture window positioning, and connection to video streams. Each of these actual hardware devices has an associated abstracted part that is used by the engine manager to construct a software model of the hardware that is needed to fulfill a request.

Figure 4:
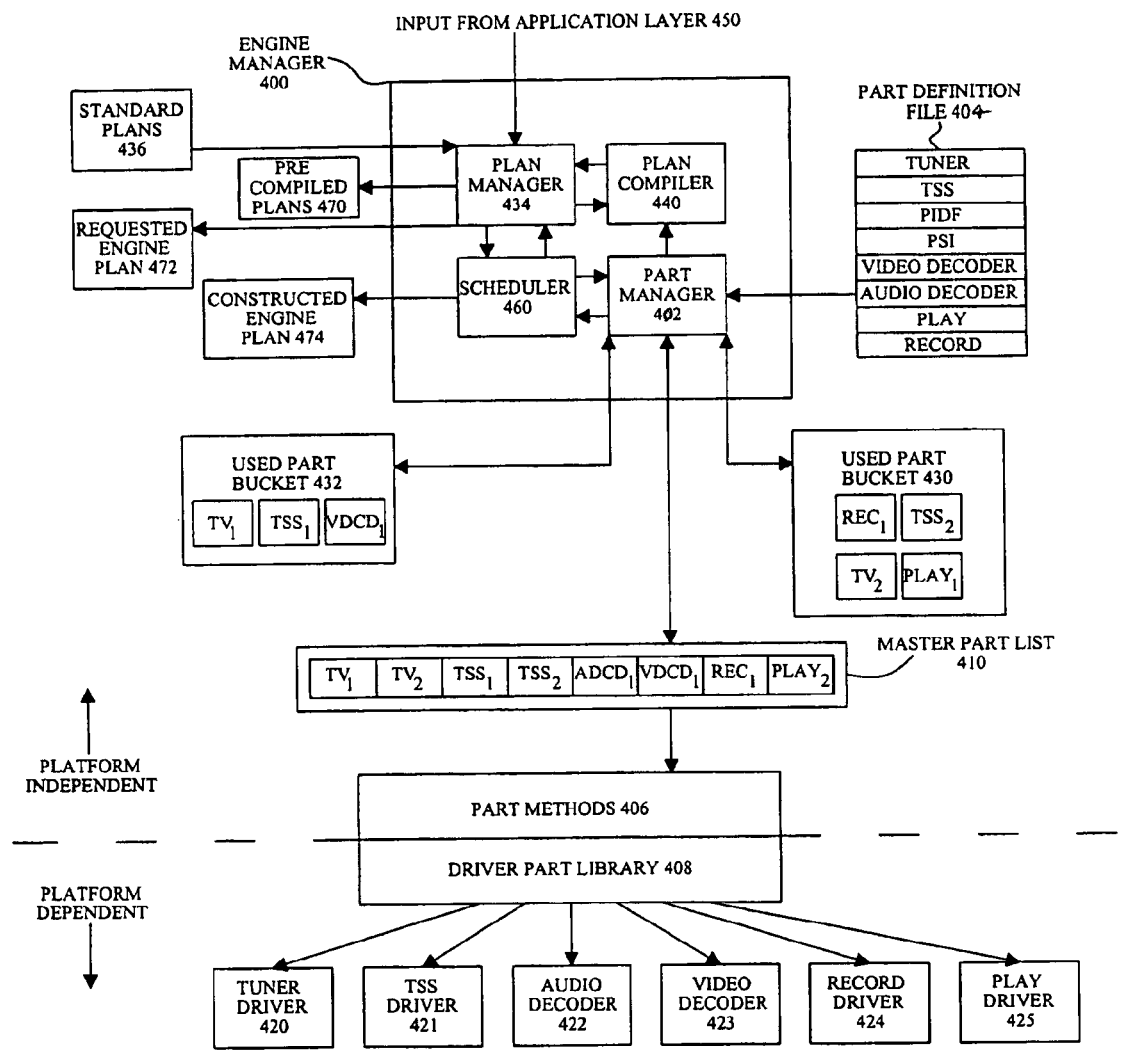
FIG. 4 is a block diagram showing a device translation layer (DTL) according to an embodiment of the present invention.

FIG. 4 is a more detailed description of the engine manager and the DTL according to an embodiment of the present invention that allows the source code to be decoupled from the hardware. When the engine manager 400 is first booted, its part manager 402 reads one or more part definition files 404 and loads the methods 406 associated with each part, for instance by loading a DLL file having those methods in executable form. Engine manager 404 invokes an "init" method for each part, which in turn calls a driver part library 408 to open the driver 420-425 that will instantiate the part. If the "init" is successful, engine manager 400 adds the part to a master part list 410. When the first engine is to be created all the parts in the master parts list 410 are copied to a free part bucket 430. As parts are used in the free part bucket 430, they are moved to a used part bucket 432.

The engine manager enters a second phase of its boot process according to an embodiment of the present invention. In the second phase, a plan manager 434 receives files in an Engine Description Language (EDL) that define the most often used plans 436. The engine plan is defined as a connected, directed acyclic graph (DAG) of part classes with optional constraints and parameters. The plan manager 434 passes the EDL plans 436 to a plan compiler 440, which converts the name of each class into a pointer to the class structure in the master part list 410. It also verifies that the topology is legal. The plan manager 434 takes the pre compiled plans and stores them in a pre compiled plan bin 470 for later use, tabulating each plan's ultimate source and destination.

When input from the application layer 450 is received it sometimes takes the form of a (source, destination) pair specifying the most upstream source and the most downstream destination needed to fulfill the request. The request is passed to the plan manager 434 which searches for pre-compiled plans 470 that match the request or builds a new engine plan 472 if no pre-compiled plan is available, by connecting the abstract hardware parts that will need to be connected to fulfill the source, destination request. Alternatively, an engine plan can be supplied directly to the plan manager from the application level 450. In any case, the engine plan once constructed or received is sent to a scheduler 460 which is invoked to assign the actual resources needed to fulfill the request for a constructed engine plan 474.

Figure 5:
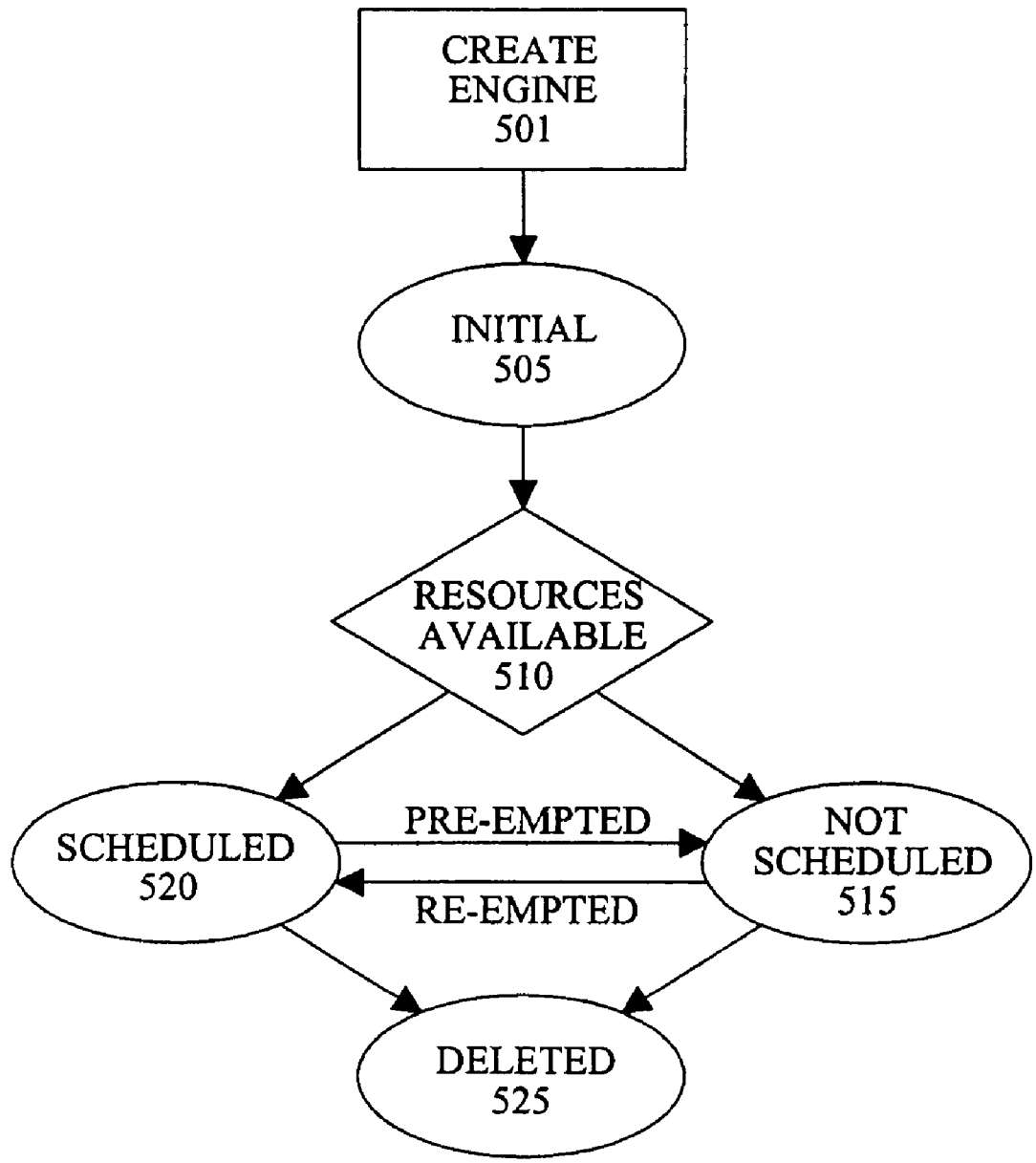
FIG. 5 is a state diagram showing the general life cycle of an engine according to an embodiment of the present invention.

Once engine plans are generated, they must be scheduled so they can be used in a timely and appropriate manner. In determining whether engines can be scheduled, the system not only looks to whether all the parts needed are available, but also whether constructing such a hardware configuration would exceed the available bandwidth for the set-top box environment. FIG. 5 is a state diagram showing the general flow of scheduling according to an embodiment of the present invention. FIG. 5 shows the general life cycle of an engine, which includes the following: birth, which leads to an initial scheduling, life, in which scheduling moves an engine between the scheduled and not Scheduled states, and death.

A create engine module 501 creates an engine plan, for instance as shown with respect to the embodiment of FIG. 4. The engine plan is initialized to an initial state 505, which triggers scheduling of the engine. If resources are available in block 510, the engine is scheduled and flow transitions to state 520. If resources are not available at decision block 510, then the engine is not scheduled and flow proceeds to state 515. A currently scheduled Engine can be pre-empted, thus transitioning from the scheduled state 520 to the not-scheduled state 515, or re-empted, thus transitioning from the not-scheduled state 515 to the scheduled state 520. The engine plan is eventually deleted at state 525 either from the initial state 505, the scheduled state 520, for instance after the user has finished using the required engine, or the not-scheduled state 515, if the engine never was scheduled.

FIGS. 6, 7, 8, and 9 show examples of commonly used engines, which are shown as DAGs with in-band resource modules as nodes forming paths taking input signals from a cable, or other broadcast input source and outputting video and audio signals, for instance to be used by a display such as a television or computer monitor. The engines of FIGS. 6-9 can be constructed, for instance as pre-compiled engines upon booting up of the set-top box environment, or they can be constructed on the fly if a user, when interacting with the application layer performs an action that requires one of the constructed engines of FIGS. 6-9.

Figure 6:
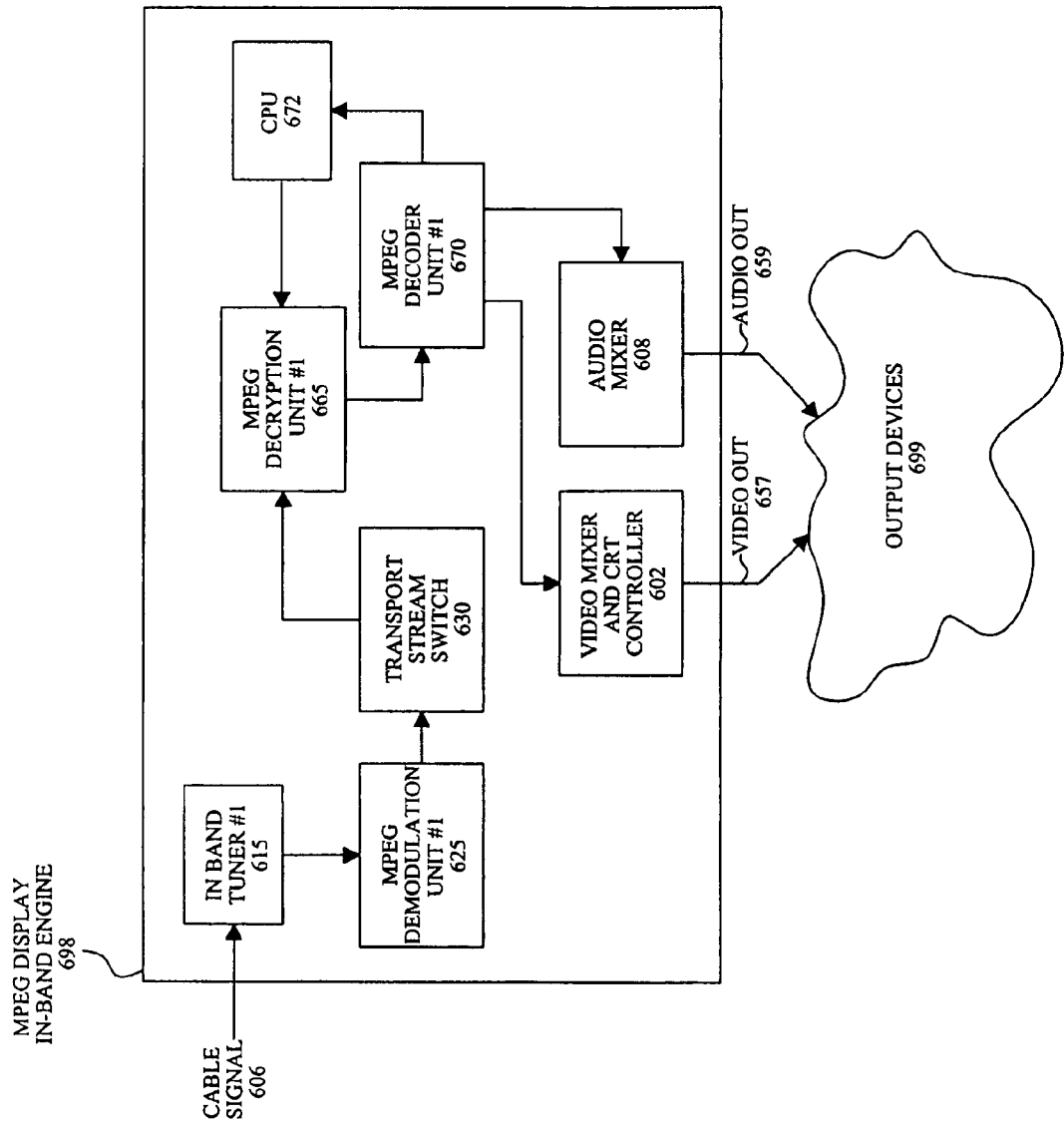
FIG. 6 is a directed acyclic graph of a commonly used engine according to an embodiment of the present invention.

FIG. 6 shows an example of an in-band engine 698, which decrypts, decodes, and displays MPEG video and audio signals according to one embodiment of the present invention. An analog cable signal 606 is initially received by the in-band tuner 615 and the signal subsequently processed by the MPEG de-modulation unit 625 and then MPEG decryption unit 665, via transport stream switch 630. The data is then passed to MPEG decoder unit 670 and is processed in loop using central processing unit 672 before being output to video mixer & CRT controller 602 and audio mixer 608. Units 602 and 608 produce video out signal 657 and the audio out signal 659 which are passed to one or more output devices 699 capable of handling video and/or audio signals such a television, a monitor, speakers, or a combination of these devices integrated into a single device.

Figure 7:
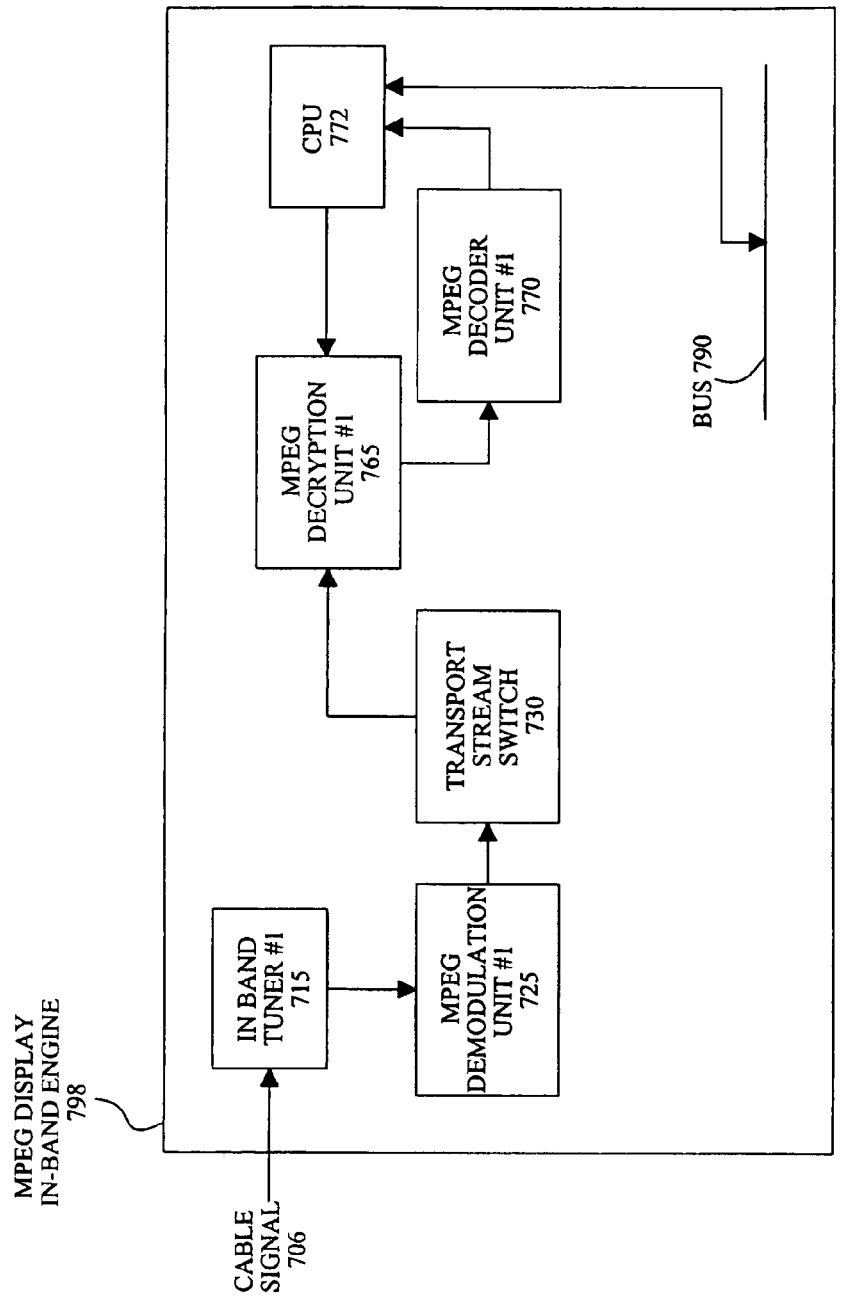
FIG. 7 is a directed acyclic graph of another commonly used engine according to an embodiment of the present invention.

FIG. 7 shows an example of an MPEG data only, in band engine 798, which decrypts, decodes, and extracts MPEG private sections. An analog cable signal 706 is initially received by an in band tuner 715 and the signal is subsequently processed by an MPEG de-modulation unit 725 and then an MPEG decryption unit 765, via a transport stream switch 730. The data is then passed to MPEG decoder unit 770 and is processed in loop using central processing unit 772 before being output to a bi-directional connection 780 with bus 790.

Figure 8:
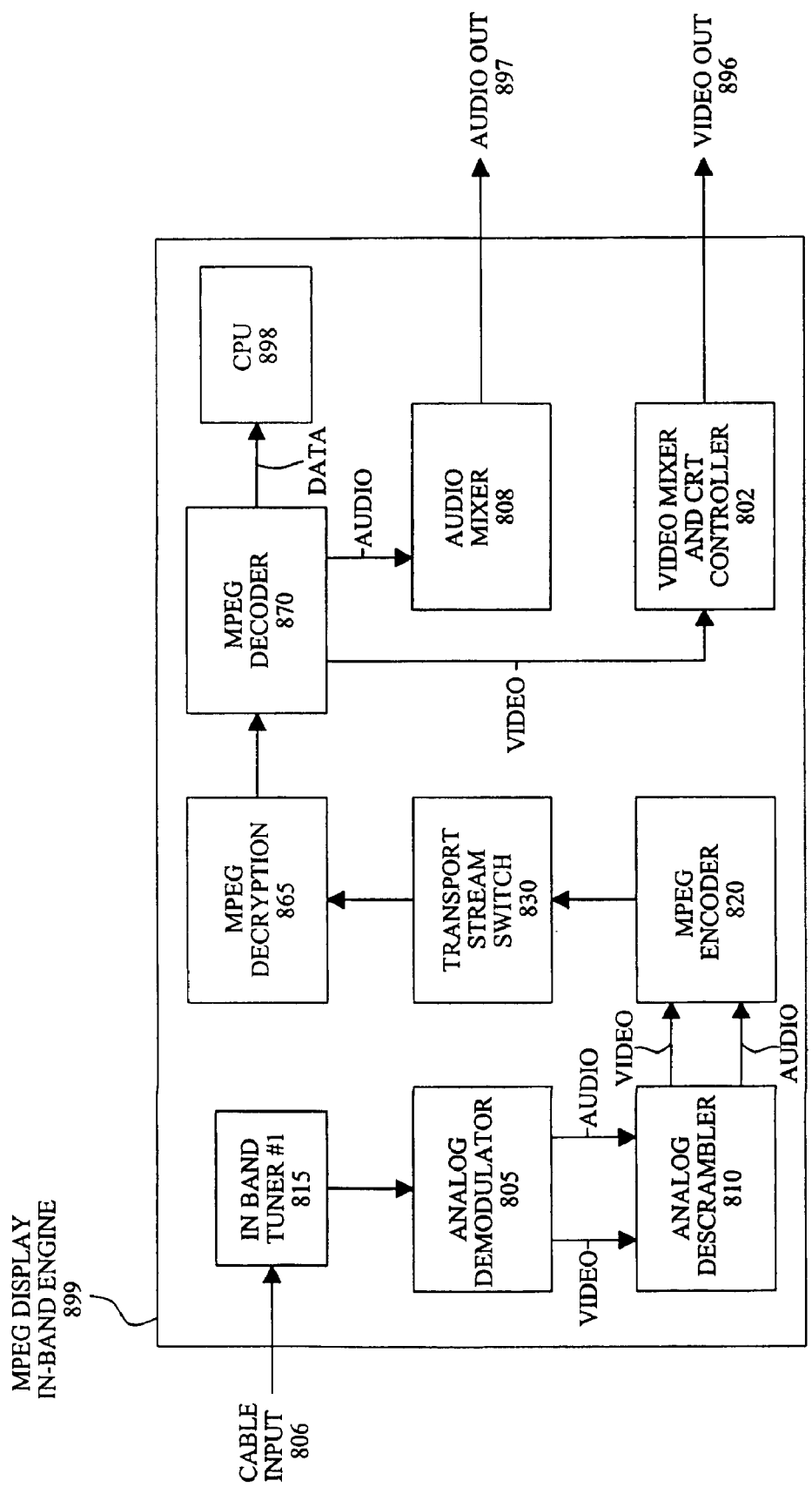
FIG. 8 is a directed acyclic graph of another commonly used engine according to an embodiment of the present invention.

FIG. 8 shows an example of an in band engine 899 that displays analog video and audio. An analog cable signal 806 is initially received by an in band tuner 815 and sent to an analog demodulator 805. The signal is split into audio and video components and passed to analog descrambler 810. The separated audio and video components are then sent to MPEG encoder 820 and then transport stream switch 830. After leaving transport stream switch 830 the signal travels to MPEG decryptor 865 and then to MPEG decoder 870. The signal is used by CPU 898 and its separate audio and video components are passed to audio mixer 808 and video mixer and CRT controller 802. Audio mixer 808 and video mixer and CRT controller 802 output audio out signals 897 and video out signals 896 respectively.

Figure 9:
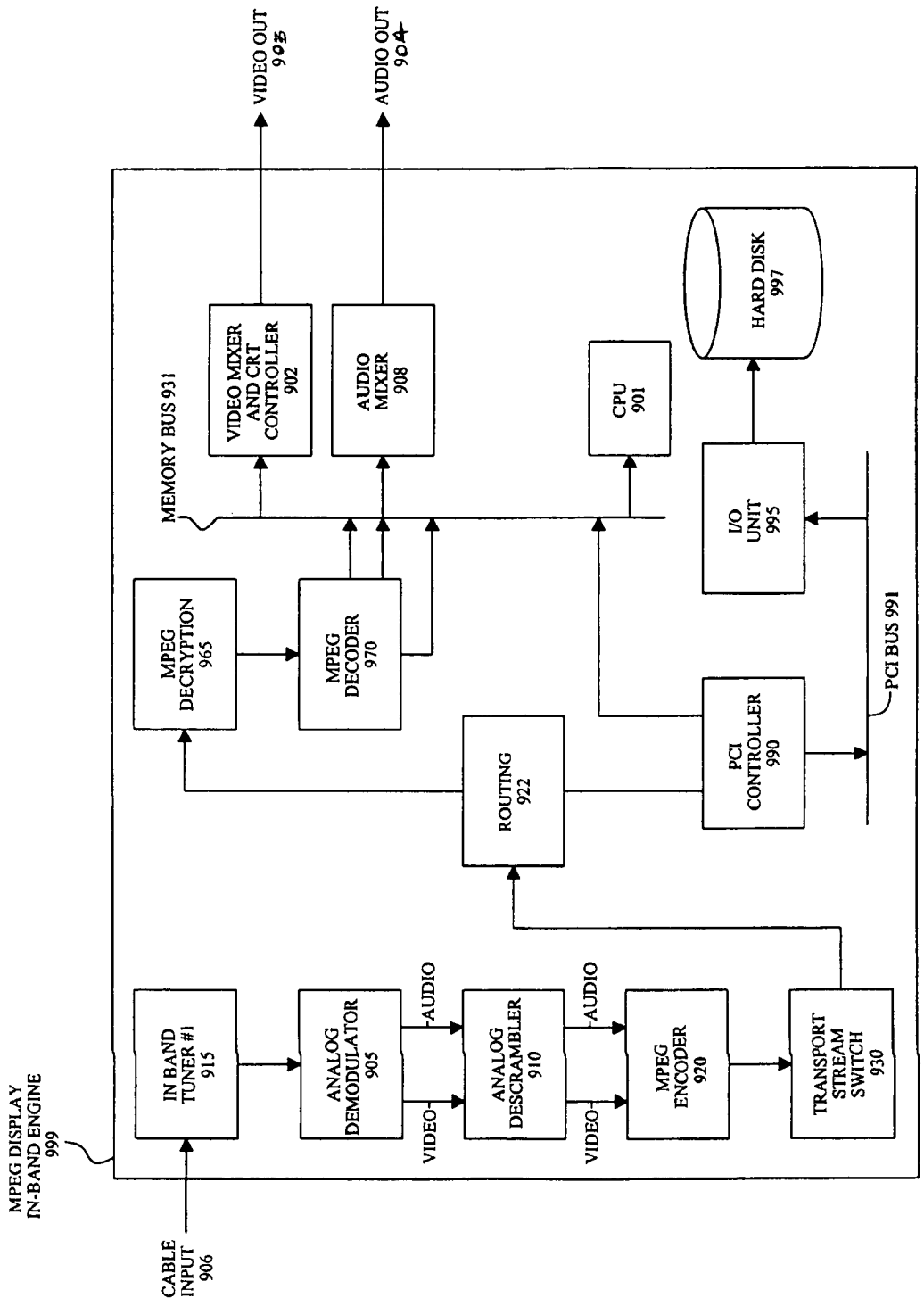
FIG. 9 is a directed acyclic graph of another commonly used engine according to an embodiment of the present invention.

FIG. 9 shows an example of an in band engine 999, which displays analog video and audio while recording. An analog cable signal 906 is provided to engine 999 and received by an in band tuner 915, which passes the signal to an analog de modulator 915. The signal is split into audio and video components and passed to analog descrambler 910. The separated audio and video components are then sent to MPEG encoder 820 and then transport stream switch 830. Transport stream switch 930 sends the signal to routing block 922 which routes the signal in a first and a second direction.

The first direction is to transfer the signal to a non-volatile storage medium, such as hard disk 997. To perform the routing to hard disk 997 routing block 922 sends the signal to a PCI controller 990, which in turn transfers the signal to PCI bus 991 which, facilitates moving the signal to an I/O unit 995. I/O unit 995 interacts with hard disk 997 to transfer the signal to hard disk 997 so that it can be stored for later use, for instance if the user wants to later retrieve the signal from hard disk 997 and watch it on an output device such as a television.

The second direction routing block 922 routes the signal is to provide audio out 903 and video out 904 signals, for instance to be used on a display device such as a television or computer monitor and/or speakers. To facilitate such a transfer, routing block 922 sends the signal to MPEG decryptor 965 and then to MPEG decoder 970. MPEG decoder 970 splits the signal into audio, video, and data components, which are all transferred to memory bus 931. From memory bus 931, a CPU 901 is used to handle the data. The audio and video components of the signal are received at audio mixer 908 and video mixer and CRT controller 902 respectively. Audio mixer 908 and video mixer and CRT controller 902 then output the audio out signal 903 and video out signal 904, which is then used by an appropriate output device.

Figure 10:
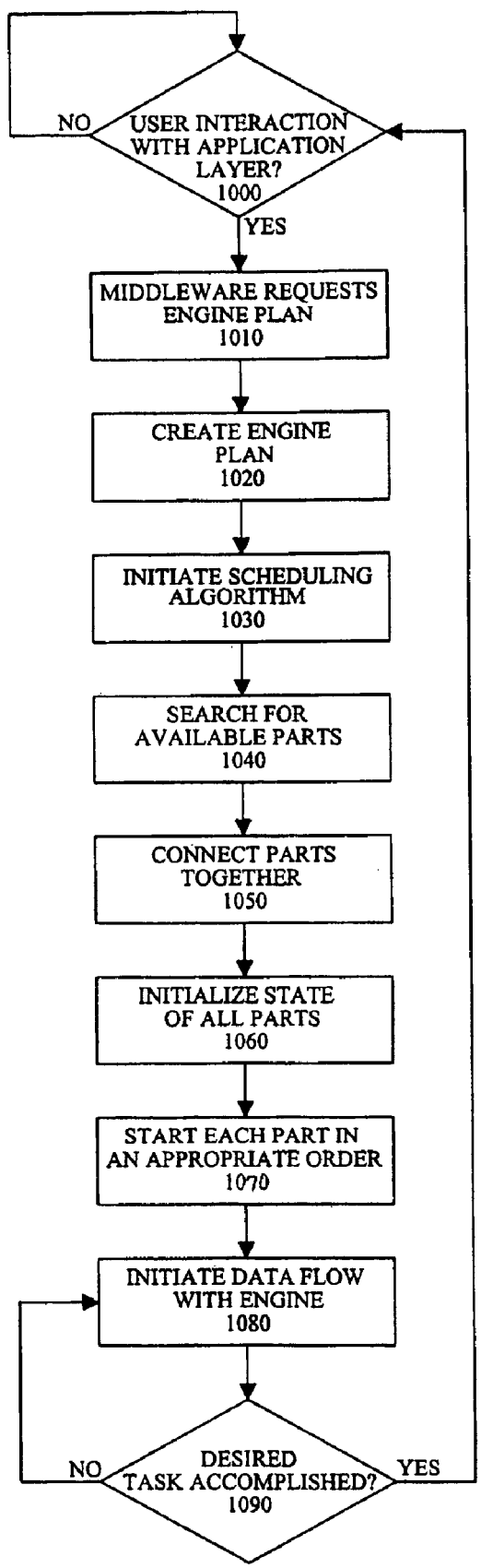
FIG. 10 is a flowchart showing the general operation of a system where the dependency of source code on the in-band resources of a set-top box is minimized.

FIG. 10 is a flowchart showing generally how the dependency of source code on the in-band resources of a set-top box steps is minimized. Initially, the system waits at block 1000 until a user interacts with an application layer to accomplish some high-level task, such as change the channel or record a show. When block 1000 becomes true, middleware requests an engine of a specific type from an engine manager at block 1010. At block 1020 the engine manager translates the type of the engine into an engine plan, which is a specification of what kinds of parts should be connected together to form an engine.

At block 1030, a scheduling algorithm is initiated, which searches for available parts needed by the plan at block 1040, connects the parts together at block 1050, initializes the state of all the parts in the engine at block 1060, starts each part in an appropriate order at block 1070, and initiates data flow within the engine at block 1080. At block 1090 it is determined if the desired task has been accomplished. If not, the process repeats at block 1080. Otherwise, the task has been accomplished and the process repeats at block 1000.

The scheduling algorithm is itself device-independent, working only on the models of the parts and engines that have been provided by the device driver developers. All code above the Scheduler works with engines, which are in themselves hardware abstractions. Thus, all code above the basic part abstraction code is device-independent. Only the device-drivers themselves and a very small layer above the device drivers has any independence. In this sense, the Engine Manager model reduces device dependence in the software to near the absolute minimum.

Appendix A provides two examples of descriptions of parts in a part definition language (PDL). The first PDL is for an audio decoder, the second PDL is for a video decoder. Appendix B provides three examples of engine plans in an engine description language (EDL). The first EDL is for watching a live broadcast signal. The second EDL is for playing back a stored broadcast signal. The third EDL is for recording a broadcast signal.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

APPENDIX A

```
# audio.pdl
DefinePartClass AudioDecode {
    Parameters {
        int [no_default] audio_pid;
        int [no_default] audio_type;
        int [no_default] pcr_pid;
        int pcr_channel;
        int transport_band;
    }
    Methods {
        mit         -> "libadecode.so(AudioDecodeInit)"
        Alloc       -> "libadecode.so(AudioDecodeAlloc) ";
        AddInput    -> "libadecode.so(AudioDecodeAddInput)";
        Config      -> "libadecode.so(AudioDecodeConfig)";
        Setparm     -> "libadecode.so(AudioDecodeSetParm)";
        Status      -> "libadecode.so(AudioDecodeStatus)";
        Start       -> "libadecode.so(AudioDecodeStart)";
        Stop        -> "libadecode.so(AudioDecodeStop)";
        Free        -> "libadecode.so(AudioDecodeFree)";
        Disable     -> "libadecode.so(AudioDecodeDisable)";
        ReEnable    -> "libadecode.so(AudioDecodeReEnable)";
    }
}
DefinePart AudioDecode audio_decode {
    must_input_one_of = pes_pid, hd_playback_1, sd_playback_1, sd_playback_2;
    output = none;
}
# video.pdl
DefinePartClass HD_VideoDecode {
    Parameters {
    }
    Methods {
        Alloc       -> "libvdecode.so(HD_VideoDecodeAlloc)";
        AddInput    -> "libvdecode.so(HD_VideoDecodeAddInput)";
        Config      -> "libvdecode.so(HD_VideoDecodeConfig)";
        Start       -> "libvdecode.so(HD_VideoDecodeStart)";
        Init        -> "libvdecode.so(HD_VideoDecodeInit)";
        SetParm     -> "libvdecode.so(HD_VideoDecodeSetParm)";
        Status      -> "libvdecode.so(HD_VideoDecodeStatus)";
        Stop        -> "libvdecode.so(HD_VideoDecodeStop)";
        Free        -> "libvdecode.so(HD_VideoDecodeFree)";
        Disable     -> "libvdecode.so(HD_VideoDecodeDisable)";
        ReEnable    -> "libvdecode.so(HD_VideoDecodeReEnable)".
    }
}
DefinePartClass SD_VideoDecode {
    Parameters {
    }
    Methods {
        Alloc       -> "libvdecode.so(SD_VideoDecodeAlloc)";
        AddInput    -> "libvdecode.so(SD_VideoDecodeAddInput)";
        Config      -> "libvdecode.so(SD_VideoDecodeConfig)";
        Start       -> "libvdecode.so(SD_VideoDecodeStart)";
        Init        -> "libvdecode.so(SD_VideoDecodeInit)";
        SetParm     -> "libvdecode.so(SD_VideoDecodeSetParm)";
        Status      -> "libvdecode.so(SD_VideoDecodeStatus)";
        Stop        -> "libvdecode.so(SD_VideoDecodeStop)";
        Free        -> "libvdecode.so(SD_VideoDecodeFree)";
        Disable     -> "libvdecode.so(SD_VideoDecodeDisable)";
        ReEnable    -> "libvdecode.so(SD_VideoDecodeReEnable)";
    }
}
# this one can do HD
Definepart HD_VideoDecode hd_video_decode_1 {
```

APPENDIX A-continued

```
    must_input_one_of = pes_pid, hd_playback_1;
    output = main_scaler
    eliminates = sd_video_decode_1;
    }
}
# this one cannot do HD
DefinePart SD_VideoDecode sd_video_decode_1 {
    must_input_one_of = pes_pid, sd_playback_1;
    output = main_scaler;
    eliminates = hd_video_decode_1;
}
# this one cannot do HD
Definepart SD_VideoDecode sd_video_decode_2 {
    must_input_one_of = pes_pid, sd_playback_2;
    output = pip_scaler;
}
```

APPENDIX B

```
# live.edl
EngineClass HD_LiveVideo {
    Tuner tuner {
        # this tuner will output to a Digital demodulator
        Connections {
            in = None;
            out = ddemod;
        }
    };
    D_Demod ddemod{
        Connections {
            in = tuner;
            out = tss;
        }
    };
    TSS tss {
        Connections {
            in = ddemod;
            out = video_pid;
            out = pcr_pid;
        }
    };
    PES_PID video_pid {
        Connections {
            in = tss;
            out = decode;
        }
    };
    PES_PID pcr_pid {
        Connections {
            in = tss;
            out = decode;
        }
    };
    HD_VideoDecode decode {
        Connections {
            in = video_pid;
            in = pcr_pid;
            out = scaler;
        }
    };
    VideoScaler scaler {
        Connections {
            in = decode;
            out = None;
        }
    };
};
Engineclass SD_LiveVideo {
    Tuner tuner {
        # this tuner will output to a Digital demodulator
        Connections {
            in = None;
            out = ddemod;
        }
    };
    D_Demod ddemod {
```

APPENDIX B-continued

```
            Connections {
                in = tuner;
                out = tss;
            }
        };
        TSS tss {
            Connections {
                in = ddemod;
                out = video_pid;
                out = pcr_pid;
            }
        };
        PES_PID Video_pid {
            Connections {
                in = tss;
                out = decode;
            }
        };
        PES_PID pcr_pid {
            Connections {
                in = tss;
                out = decode;
            }
        };
        SD_VideoDecode decode {
            Connections {
                in = video_pid;
                in = pcr_pid;
                out = scaler;
            }
        };
        VideoScaler scaler {
            Connections {
                in = decode;
                out = None;
            }
        };
};
EngineClass LiveAudio {
        Tuner timer {
            # this tuner will output to a Digital demodulator
            Connections {
                in = None;
                out = ddemod;
            }
        };
        D_Demod ddemod {
            Connections {
                in = tuner;
                out = tss;
            }
        };
        TSS tss {
            Connections {
                in = ddemod;
                out = audio_pid;
                out = pcr_pid;
            }
        };
        PES_PID audio_pid (
            Connections {
                in = tss;
                out = adecode;
            }
        };
        PES_PID pcr_pid {
            Connections {
                in = tss;
                out = adecode;
            }
        };
        AudioDecode adecode {
            Connections {
                in = audio_pid;
                in = pcr_pid;
                out = None;
            }
        };
};
```

APPENDIX B-continued

```
EngineClass A_LiveVideo {
        Tuner timer {
            # this tuner will output to a Digital demodulator
            Connections {
                in = None;
                out = ademod;
            }
        };
        automatic A_Demod ademod {
            Connections {
                in = tuner;
                out = tss;
            }
        };
        TSS tss {
            Connections {
                in = ademod;
                out = video_pid;
                out = pcr_pid;
            }
        };
        automatic PES_PID video_pid {
            Connections {
                in = tss;
                out = decode;
            }
        };
        automatic PES_PID pcr_pid {
            Connections {
                in = tss;
                out = decode;
            }
        };
        SD_VideoDecode decode {
            Connections {
                in = video_pid;
                in = pcr_pid;
                out = scaler;
            }
        };
        VideoScaler scaler {
            Connections {
                in = decode;
                out = None;
            }
        };
};
EngineClass A_LiveAudio {
        Tuner tuner {
            # this tuner will output to a Digital demodulator
            Connections {
                in = None;
                out = ademod;
            }
        };
        automatic A_Demod ademod {
            Connections {
                in = tuner;
                out = tss;
            }
        };
        TSS tss {
            Connections {
                in = ademod;
                out = audio_pid;
                out = pcr_pid;
            }
        };
        automatic PES_PID audio_pid {
            Connections {
                in = tss;
                out = adecode;
            }
        };
        automatic PES_PID pcr_pid {
            Connections {
                in = tss;
                out = adecode;
            }
```

APPENDIX B-continued

```
        };
        automatic AudioDecode adecode {
            Connections {
                in = audio_pid;
                in = pcr_pid;
                out = None;
            }
        };
    };
# playback.edl
EngineClass HD_PlaybackVideo {
    HD_Playback play {
        # this accepts input, from the disk
        Connections {
            in = None;
            out = decode;
        }
    };
    HD_VideoDecode decode {
        Connections {
            in = play;
            out = scaler;
        }
    };
    VideoScaler scaler (
        Connections {
            in = decode;
            out = None;
        }
    };
};
EngineClass SD_PlaybackVideo {
    SD_Playback play {
        # this accepts input from the disk
        Connections {
            in = None;
            out = decode;
        }
    };
    SD_VideoDecode decode {
        Connections {
            in = play;
            out = scaler;
        }
    };
    VideoScaler scaler {
        Connections {
            in = decode;
            out = None;
        }
    };
};
EngineClass HD_PlaybackAudio {
    HD_Playback play {
        # this accepts input from the disk
        Connections {
            in = None;
            out = adecode;
        }
    };
    AudioDecode adecode {
        Connections {
            in = play;
            out = None;
        }
    };
};
EngineClass SD_PlaybackAudio {
    SD_Playback play {
        # this accepts input from the disk
        Connections {
            in = None;
            out = adecode;
        }
    };
    AudioDecode adecode {
        Connections {
            in = play;
            out = None;
```

APPENDIX B-continued

```
            }
        }
    };
# record.edl
EngineClass A_Record {
    Record record {
        Connections {
            in = video_pid;
            in = audio_pid;
            in = pcr_pid;
            out = None;
        }
    };
    Tuner tuner {
        # this tuner will output to an Analog demodulator
        Connections {
            in = None;
            out = ademod;
        }
    };
    automatic A_Demod ademod {
        Connections {
            in = tuner;
            out = tss;
        }
    };
    TSS tss {
        Connections {
            in = ademod;
            out = video_pid;
            out = audio_pid;
            out = pcr_pid;
        }
    };
    automatic PES_PID video_pid {
        Connections {
            in = tss;
            out = record;
        }
    };
    automatic PES_PID audio_pid {
        Connections {
            in = tss;
            out = record;
        }
    };
    automatic PES_PID pcr_pid {
        Connections {
            in = tss;
            out = record;
        }
    };
};
EngineClass Extra_Record {
    Tuner.tuner {
        # this tuner will output to a Digital demodulator
        Connections {
            in = None;
            out = ddemod;
        }
    };
    D_Demod ddemod {
        Connections {
            in = tuner;
            out = tss;
        }
    };
    TSS tss {
        Connections {
            in = ddemod;
            out = video_pid;
            out = audio_pid;
            out = pcr_pid;
            out = data_pid;
            out = second_audio;
        }
    };
    PES_PID video_pid {
        Connections {
```

APPENDIX B-continued

```
        in = tss;
        out = record;
    }
};
PES_PID audio_pid {
    Connections {
        in = tss;
        out = record;
    }
};
PES_PID pcr_pid
    Connections {
        in = tss;
        out = record;
    }
};
PES_PID data_pid
    Connections {
        in = tss;
        out = record;
    }
};
PES_PID second_audio {
    Connections {
        in = tss;
        out = record;
    }
};
Record record {
    Connections {
        in = video_pid;
        in = audio_pid;
        in = pcr_pid;
        in = data_pid;
        in = second_audio;
        out = None;
    }
}
```

What is claimed is:

1. An apparatus, comprising:
one or more hardware components having device drivers;
a master part list of said hardware components;
a free part list comprising a first subset of said hardware components;
a used part list comprising a second subset of said hardware components;
an application layer adapted to receive a user input requiring a response from the apparatus;
one or more hardware independent definitions for the one or more hardware components;
a compiler comprising a first component configured to build one or more plans using said hardware independent definitions to identify at least one of the hardware independent definitions needed to fulfill the response, in response to an input from the application layer, said plans capable of interfacing with said device drivers; and
a scheduler configured to allocate said hardware components to correspond to said plans, wherein said scheduler reserves a portion of said first subset of said hardware components in said free part list when allocating resources and then moves said portion to said second subset in said used part list.

2. A method, comprising:
providing one or more hardware independent definitions for one or more hardware components having device drivers;
receiving a user input requiring a response;
providing a master part list of said hardware components;
providing a free part list comprising a first subset of said hardware components;
providing a used part list comprising a second subset of said hardware components;
compiling one or more plans using said hardware independent definitions to identify at least one of the hardware independent definitions needed to fulfill the response, in response to an input from an application layer, said plans capable of interfacing with said device drivers;
allocating said hardware components, which correspond to said plans;
reserving a portion of said first subset of said hardware components in said free part list when allocating resources; and
moving said portion to said second subset in said used part list.

3. The method of claim 2, wherein said hardware independent definitions are written in a parts definition language.

4. The method of claim 2, wherein said plans are written in an engine definition language.

5. The method of claim 2 wherein one of said hardware independent definitions is for a tuner.

6. The method of claim 2 wherein one of said hardware independent definitions is for a transport stream switch.

7. The method of claim 2 wherein one of said hardware independent definitions is for a packet identifier filter (PIDF).

8. The method of claim 2 wherein one of said hardware independent definitions is for a program specific information (PSI) filter.

9. The method of claim 2 wherein one of said hardware independent definitions is for a video decoder.

10. The method of claim 2 wherein one of said hardware independent definitions is for an audio decoder.

11. The method of claim 2 wherein one of said hardware independent definitions is for a playback function.

12. The method of claim 2 wherein one of said hardware independent definitions is for a record function.

13. The method of claim 2, wherein said step of compiling further comprises:
pre-compiling one or more common plans automatically.

14. The method of claim 2 wherein said plans comprise a software model, said software model comprising a hardware independent configuration of one or more parts and connections between said parts, each of said parts having an associated method, further comprising using said method to communicate with a device driver associated with a hardware component that corresponds to said part.

15. A system, comprising:
an application layer adapted to receive a user input requiring a response from the apparatus;
means for providing one or more hardware independent definitions for one or more hardware components having device drivers;
means for compiling one or more plans using said hardware independent definitions to identify at least one of the hardware independent definitions needed to fulfill the response, in response to an input from the application layer, said plans capable of interfacing with said device drivers;
means for scheduling said hardware components to correspond to said plans;
means for providing a master part list of said hardware components;
means for providing a free part list comprising a first subset of said hardware components; and
means for providing a used part list comprising a second subset of said hardware components,
wherein said means for scheduling reserves a portion of said first subset of said hardware components in said free part list when allocating resources and then moves said portion to said second subset in said used part list.

16. The system of claim 15, wherein said hardware independent definitions are written in a parts definition language.

17. The system of claim 15, wherein said plans are written in an engine definition language.

18. The system of claim 15 wherein one of said hardware independent definitions is for a tuner.

19. The system of claim 15 wherein one of said hardware independent definitions is for a transport stream switch.

20. The system of claim 15 wherein one of said hardware independent definitions is for a packet identifier filter (PIDF).

21. The system of claim 15 wherein one of said hardware independent definitions is for a program specific information (PSI) filter.

22. The system of claim 15 wherein one of said hardware independent definitions is for a video decoder.

23. The system of claim 15 wherein one of said hardware independent definitions is for an audio decoder.

24. The system of claim 15 wherein one of said hardware independent definitions is for a playback function.

25. The system of claim 15 wherein one of said hardware independent definitions is for a record function.

26. The system of claim 15, wherein said means for compiling further comprises:
 means for pre-compiling one or more common plans automatically.

27. The system of claim 15 wherein said plans comprise a software model, said software model comprising a hardware independent configuration of one or more parts and connections between said parts, each of said parts having an associated method, said method capable of communicating with a device driver associated with a hardware component that corresponds to said part.

28. An apparatus, comprising:
 one or more hardware components having device drivers;
 a master part list of the hardware components;
 a free part list comprising a first subset of the hardware components;
 a used part list comprising a second subset of the hardware components;
 one or more hardware independent definitions for the one or more hardware components;
 a compiler configured to build one or more plans using the hardware independent definitions, the plans capable of interfacing with the device drivers; and
 a scheduler configured to allocate the hardware components to correspond to the plans, wherein the scheduler reserves a portion of the first subset of the hardware components in the free part list when allocating resources and then moves the portion to the second subset in the used part list.

29. The apparatus of claim 28, wherein said hardware independent definitions are written in a parts definition language.

30. The apparatus of claim 28, wherein said plans are written in an engine definition language.

31. The apparatus of claim 28 wherein one of said hardware independent definitions is for a tuner.

32. The apparatus of claim 28 wherein one of said hardware independent definitions is for a transport stream switch.

33. The apparatus of claim 28 wherein one of said hardware independent definitions is for a packet identifier filter (PIDF).

34. The apparatus of claim 28 wherein one of said hardware independent definitions is for a program specific information (PSI) filter.

35. The apparatus of claim 28 wherein one of said hardware independent definitions is for a video decoder.

36. The apparatus of claim 28 wherein one of said hardware independent definitions is for an audio decoder.

37. The apparatus of claim 28 wherein one of said hardware independent definitions is for a playback function.

38. The apparatus of claim 28 wherein one of said hardware independent definitions is for a record function.

39. The apparatus of claim 28, wherein said compiler further comprises:
 a second component for pre-compiling one or more common plans automatically.

40. The apparatus of claim 28 wherein said plans comprise a software model, said software model comprising a hardware independent configuration of one or more parts and connections between said parts, each of said parts having an associated method, said method capable of communicating with a device driver associated with a hardware component that coffesponds to said part.

41. The apparatus of claim 28, wherein the input from the application layer identifies a source and a destination of the signal path for fulfilling the response.

* * * * *